US005994453A

United States Patent [19]
Banning et al.

[11] Patent Number: 5,994,453
[45] Date of Patent: Nov. 30, 1999

[54] PHASE CHANGE INK FORMULATION CONTAINING A COMBINATION OF A URETHANE RESIN, A MIXED URETHANE/ UREA RESIN, A MONO-AMIDE AND A POLYETHYLENE WAX

[75] Inventors: Jeffrey H. Banning, Hillsboro; Donald R. Titterington, Tualatin; Clifford R. King; Michael B. Meinhardt, both of Salem, all of Oreg.

[73] Assignee: Tektronix, Inc., Wilsonville, Oreg.

[ * ] Notice: This patent is subject to a terminal disclaimer.

[21] Appl. No.: 09/013,410

[22] Filed: Jan. 26, 1998

Related U.S. Application Data

[63] Continuation-in-part of application No. 08/672,815, Jun. 28, 1996, Pat. No. 5,830,942.

[51] Int. Cl.⁶ .............................. C08J 3/00; C08K 3/20; C08L 75/00; C09D 11/12; B41F 23/04
[52] U.S. Cl. ........................ 524/590; 101/487; 101/491; 106/31.01; 106/31.13; 106/31.29; 106/31.3; 106/31.43; 106/31.61; 106/31.62; 427/256; 427/385.5; 523/160; 523/161; 524/210; 524/230; 524/487; 524/488; 524/589
[58] Field of Search .................................. 524/210, 230, 524/589, 590, 487, 488; 427/256, 385.5; 106/31.01, 31.13, 31.29, 31.3, 31.43, 31.61, 31.62; 101/487, 491; 523/160, 161

[56] References Cited

U.S. PATENT DOCUMENTS

| | | | |
|---|---|---|---|
| 2,409,712 | 10/1946 | Schweitzer | 260/453 |
| 3,012,991 | 12/1961 | Schultheis et al. | 260/75 |
| 3,653,932 | 4/1972 | Berry et al. | 106/22 |
| 3,963,679 | 6/1976 | Ullrich et al. | 260/75 |
| 3,963,710 | 6/1976 | Aufdermarsh, Jr. | 260/247.2 |
| 4,011,311 | 3/1977 | Noomen et al. | 424/65 |
| 4,293,470 | 10/1981 | Cuscurida | 260/45.9 |
| 4,297,501 | 10/1981 | Becker et al. | 560/24 |
| 4,334,032 | 6/1982 | Patton, Jr. et al. | 521/115 |
| 4,381,403 | 4/1983 | Falcone et al. | 560/24 |
| 4,390,369 | 6/1983 | Merritt et al. | 106/31 |
| 4,484,948 | 11/1984 | Merritt et al. | 106/31 |
| 4,501,915 | 2/1985 | McCoy | 560/157 |
| 4,537,960 | 8/1985 | Merger et al. | 544/86 |
| 4,665,146 | 5/1987 | Tortorello et al. | 526/304 |
| 4,684,956 | 8/1987 | Ball | 346/1.1 |
| 4,810,820 | 3/1989 | Slack et al. | 560/27 |
| 4,851,045 | 7/1989 | Taniguchi | 106/31 |
| 4,889,560 | 12/1989 | Jaeger et al. | 106/27 |
| 4,889,761 | 12/1989 | Titterington et al. | 428/195 |
| 5,006,170 | 4/1991 | Schwarz et al. | 106/20 |
| 5,059,647 | 10/1991 | Kawaguchi | 524/100 |
| 5,151,120 | 9/1992 | You et al. | 106/27 |
| 5,195,430 | 3/1993 | Rise | 100/168 |
| 5,221,335 | 6/1993 | Williams et al. | 106/23 |
| 5,314,379 | 5/1994 | Neubauer et al. | 462/6 |
| 5,372,852 | 12/1994 | Titterington et al. | 427/288 |
| 5,389,720 | 2/1995 | Markusch et al. | 524/839 |
| 5,389,958 | 2/1995 | Bui et al. | 347/103 |
| 5,496,879 | 3/1996 | Griebel et al. | 524/320 |
| 5,621,022 | 4/1997 | Jaeger et al. | 523/161 |
| 5,827,918 | 10/1998 | Titterington et al. | 524/590 |
| 5,830,942 | 11/1998 | King et al. | 524/590 |

FOREIGN PATENT DOCUMENTS

| | | |
|---|---|---|
| 0187352 | 7/1986 | European Pat. Off. . |
| 0206286 | 12/1986 | European Pat. Off. . |
| 4205636 | 8/1993 | Germany . |
| 4205713 | 8/1993 | Germany . |
| 2294939 | 5/1996 | United Kingdom . |
| 9404619 | 3/1994 | WIPO . |
| 9414902 | 7/1994 | WIPO . |
| 9602399 | 9/1996 | WIPO . |
| 9602446 | 10/1996 | WIPO . |
| 9712003 | 4/1997 | WIPO . |
| 9713816 | 4/1997 | WIPO . |

OTHER PUBLICATIONS

"Polymer Chemistry—The Basic Concepts" by Paul C. Hiemenz, California State Polytechnic University, Pomona, California, p. 7.

"Technical Product Information" Luxate® Isophorone Diisocyanate, by Olin Chemicals, Olin Corporation, 2 pgs.

"Advanced Organic Chemistry" Reactions, Mechanisms, and Structure, Third Edition, by Jerry March, Professor of Chemistry, Adelphi University, 6 pgs.

*Primary Examiner*—Patrick D. Niland
*Attorney, Agent, or Firm*—William A. Simons; Ralph D'Alessandro; Francis I. Gray

[57] ABSTRACT

Phase change carrier compositions made from the combination of at least one urethane resin; at least one urethane/ urea resin; at least one mono-amide; and at least one polyethylene wax are disclosed. The order of addition of the reactants to form the reactant product urethane resin and urethane/urea resin permits the tailoring or design engineering of desired properties.

60 Claims, No Drawings

5,994,453

PHASE CHANGE INK FORMULATION CONTAINING A COMBINATION OF A URETHANE RESIN, A MIXED URETHANE/UREA RESIN, A MONO-AMIDE AND A POLYETHYLENE WAX

CROSS-REFERENCE TO RELATED APPLICATIONS

This application is a continuation-in-part application of U.S. patent application Ser. No. 08/672,815 filed on Jun. 28, 1996 now U.S. Pat. No. 5,830,942, which patent is specifically incorporated herein by reference in its entirety.

BACKGROUND OF THE INVENTION

1. Field of the Invention

The present invention relates generally to phase change inks. More particularly, the present invention relates to a phase change carrier composition containing the combination of at least one urethane resin, at least one mixed urethane/urea resin, at least one mono-amide, and at least one polyethylene wax. Additionally, the present invention relates to inks useful for printing applications formed by adding colorant materials to such carrier compositions. Still further, the present invention relates to processes of using these phase change ink compositions containing such phase change inks in a printing device. And still further, the present invention relates to the process of using polyethylene wax as a transparent overcoat layer on a printed substrate to provide improved document feed capability from a photocopier.

2. Description of the Relevant Art

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwerk Farbenfabrik Keller, Dr. Rung and Co.

Phase change inks for color printing generally comprise a phase change ink carrier composition, which is combined with a phase change ink compatible colorant. Preferably, a colored phase change ink will be formed by combining the above-described ink carrier composition with compatible subtractive primary colorants. The subtractive primary colored phase change inks of this invention can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. Pat. No. 5,621,022 assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

In addition to the above-referenced U.S. patents, many other patents describe materials for use in phase change ink jet inks. Some representative examples include U.S. Pat. Nos. 3,653,932; 4,390,369; 4,484,948; 4,684,956; 4,851,045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co-polymers.

Separately, PCT Patent Application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65° C. and obtained by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (TPGBE) and propylene glycol phenyl ether (PPL)); esterified dihydric aliphatic alcohol (e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot melt printing), or dihydric polyalkylene glycol. This PCT Application further defined the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol).

Also, PCT Patent Application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

Furthermore, U.S. Pat. No. 5,830,942, assigned to the Assignee of the present invention, teaches phase change carrier compositions that comprise the combination of a urethane resin with a urethane/urea resin that may optionally contain other ingredients such as mono-amides and polyethylene waxes. However, that U.S. Patent does not teach or explicitly suggest a phase change carrier composition that contains the combination of four critical ingredients of the carrier compositions of the present invention.

There is still a need for new materials for novel and different applications of phase change carrier compositions and inks containing such carrier compositions. There is a also a need for relatively low viscosity resins, including non-polymeric resins, and waxes designed for phase change ink jet and other forms of phase change ink printing. Additionally, needs continue to exist for phase change inks utilizing carrier compositions that produce aesthetically pleasing ink sticks and inks which do not adhere to surfaces on output. These needs are solved by the present invention by providing an improved means to tailor the properties of these resin materials for specific applications.

BRIEF SUMMARY OF THE INVENTION

An aspect of the present invention is directed to phase change carrier compositions comprising an admixture of (1) at least one urethane resin; and/or (2) at least one mixed urethane/urea resin; and (3) at least one mono-amide; and (4) at least one polyethylene wax.

Another aspect of the present invention is directed to phase change ink compositions comprising the admixture of (a) the above-noted phase change carrier composition with (b) a phase change ink compatible colorant.

Yet another aspect of the present invention is a method for producing a layer of a phase change colored ink on the surface of a substrate by either direct or indirect printing wherein the phase change ink composition in the solid phase comprises an admixture of (a) the above-noted phase change carrier composition and (b) a phase change ink compatible colorant.

Still another aspect of the present invention is a method for using a polyethylene wax as an overcoat layer above a phase change ink layer on a printed substrate such as a sheet of paper.

Features of phase change carrier compositions of the present invention include having a low viscosity, being substantially transparent and having a reduced surface coefficient of friction.

Features of the phase change inks of the present invention include ink sticks which have an improved surface appearance and better release from molds and waste collection trays. Additional features of the phase change inks of the present invention also include improved blocking performance of finished prints.

It is an advantage of the present invention that phase change carrier compositions of the present invention can be design engineered to obtain desired properties for specific printing platforms and architectures.

It is another advantage of the present invention that the present phase change inks are resins or waxes which are very pure and that are free of salts and other insoluble contaminants.

DESCRIPTION OF THE PREFERRED EMBODIMENTS

The term "nucleophile" in the present specification and claims is used as defined on page 179 of "Advanced Organic Chemistry", 3rd Edition by Jerry March,© 1985 by John Wiley and Sons, to describe a reagent that brings an electron pair to a reaction to form a new bond. The preferred nucleophiles of this invention are alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, 81984 by Marcel Dekker, Inc., to describe a term coined to designate molecules for which n (representing the number of repeating monomer units) is less than 10.

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The terms "isocyanate-derived wax" as used in the present specification and claims is defined as any crystalline or semicrystalline waxy material derived from the reaction of a fatty isocyanate with a suitable nucleophile, or the reaction of a fatty nucleophile with a suitable isocyanate, or the reaction of a fatty nucleophile with a fatty isocyanate.

The term "urethane resin" or "urethane isocyanate-derived resin" as used in the present specification and claims is defined as any resin that is a urethane which is the product of the reaction of an isocyanate and an alcohol.

The term "mixed urethane/urea resin" or "urethane/urea isocyanate-derived resin" as used in the present specification and claims is defined as any resin that is a mixed urethane/urea which is the product of the reaction of an isocyanate, an alcohol and an amine.

Any suitable reaction condition for making urethane resins or mixed urethane/urea resins by condensing alcohols and/or amines with isocyanates may be employed in the practice of the present invention. Preferably, the reaction is carried out at elevated temperatures (e.g. about 60° C. to about 160° C.) in the presence of a urethane reaction catalyst such as dibutyltindilaurate, ismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diisocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI. See J. H. Saunders and K. C. Frisch's "Polyurethanes Part I, Chemistry" published by Interscience of New York, New York in 1962 and Olin Chemicals' Luxate™ IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and $T_g$'s of about −30° C. to about 100° C. The isocyanate-derived waxes from these reactions are generally opaque waxy solids having sharp melting points from about 50° C. to about 130° C., and viscosities of about 1 cPs to about 25 cPs at 140° C. The isocyanate-derived resins and waxes display properties such that the higher the $T_g$ and the melting point, the higher is the viscosity. While the structural activity relationships are not fully understood, it is known that the $T_g$ of the isocyanate-derived resins is controlled by the proper choice of the mixture of nucleophiles in the reaction as illustrated in Table 3 in the aforementioned U.S. Pat. No. 5,830,942. Varying one or more of the readily available commodity chemicals used as chemical precursors will permit custom-tailoring of the properties of the isocyanate-derived resin and wax materials.

Preferred alcohols to react with difunctional and higher isocyanates to make either the urethane resins or the urethane/urea resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearami de-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred amines to react with difunctional and higher isocyanates to make the mixed urethane/urea resins of this invention include any monofunctional amine, with the exception of tertiary amines void of other nucleophilic functional groups (e.g., triethylamine). For instance, the mono-amine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like hexyl amine, (n-, iso-, t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex.); 3,3'-diamino-N-methyl-dipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the mixed urethane/urea resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-) propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is octadecanol.

Preferred amines to react with monofunctional isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like) octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex.); 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1,12-dodecanediamine; 3-dimethylamino-propylamine; 4,7,10-trioxa-1,13-tridecanediamine; diethylene triamine; 3,3-diamino-N-methyldipropylamine; tris(2-aminoethyl)amine, and the like. The preferred amine is octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally, amides or other nucleophile containing compounds can be reacted with the isocyanates (mono, di, and the like). Some examples include: urea, oleamide, stearamide, or the like.

Preferred precursors to the urethane resins and urethane/urea resins of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenyliso-cyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_{12}$MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Phase change inks of this invention contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change carrier composition and the inks made therefrom which collectively comprise the current invention contain a combination of urethane resins and urethane/urea resins, along with two other critical ingredients. These four critical ingredients can be supplemented with (one or more) optional ingredients to prepare commercial phase change carrier compositions. The urethane resins and mixed urethane/urea resin materials of the current invention are tailored to have the desirable properties mentioned above when used in the carrier composition of the inks of the present invention by varying one or more of the readily available commodity chemical precursors.

The phase change carrier compositions of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. Pat. No. 5,621,022, and/or pigments to produce a phase change ink. Alternatively, the phase change carrier compositions of the current invention may employ colored urethane resins or urethane/urea resins or other isocyanate-derived colored resins as described in U.S. Pat. No. 5,780,528 and assigned to the assignee of the present invention, to produce a phase change ink.

The third critical ingredient of the phase change carrier compositions and the inks made therefrom of the present invention is a mono-amide. A mono-amide compound typically comprises either a primary or secondary mono-amide, but is preferably a secondary mono-amide. Of the primary mono-amides, stearamide, such as KEMAMIDE S, manufactured by Witco Chemical Company, can be employed herein. As for the secondary mono-amides, behenyl benenamide (KEMAMIDE EX-666), and stearyl stearamide (KEMAMIDE S-180), both manufactured by Witco Chemical Company, are extremely useful mono-amides. However, stearyl stearamide (KEMAMIDE S-180) is the mono-amide of choice in producing the phase change ink compositions of the present invention.

The fourth critical ingredient of the phase change carrier compositions and the inks made therefrom of the present invention is at least one polyethylene wax. Preferably, the polyethylene wax has a molecular weight of about 500 to about 5,000; more preferably, of about 700 to about 2,000; and, most preferably, of about 800 to 1,200. Preferred polyethylene waxes are Polywax 850, Polywax 1000 or Polywax 2000, all available from Petrolite.

Preferably, the total amount of urethane resin or resins in the phase change carrier composition and the inks made therefrom will comprise about 10% to about 40%, more preferably, about 15–35% and most preferably, about 20–30%, by weight of the carrier composition. Preferably, the total amount of mixed urethane/urea resin or resins in the phase change carrier composition will likewise comprise about 10% to about 40%, more preferably about 15–35% and most preferably, about 20–30%, by weight of the carrier composition. Preferably, the total amount of mono-amide wax and polyethylene wax combined will comprise about 40% to about 70%, more preferably, about 45–60% and most preferably about 48–57% by weight of the carrier composition.

The ratio of mono-amide wax to the polyethylene wax is preferably from about 200:1 to 9:1, by weight. More preferably, this ratio is from about 50:1 to about 12:1, by weight and, most preferably, about 25:1 to about 16:1, by weight.

Prior art phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a mono-amide wax and a tetra-amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. The typical mono-amide is stearyl stearamide. A preferred tackifier resin is a glycerol ester of hydrogenated abietic (rosin) acid and a preferred antioxidant is that provided by Uniroyal Chemical Company under the tradename Naugard 524. The urethane and urethane/urea resins employed in this invention can replace one or more of the ingredients in this prior art carrier composition or inks employing the resin components of the present invention can have all of these prior art ingredients replaced by the urethane and/or urethane/urea resins disclosed herein and/or by isocyanated derived waxes.

The advantages of inks formulated with the combination of the aforementioned four critical ingredients (urethane resin, mixed urethane/urea resin, mono-amide and polyethylene wax) over the prior art phase change inks are:

(1) The urethane resins and mixed urethane/urea resins of this invention are very pure, being free of salts and other insoluble contaminants. This makes the inks made from these materials easy to filter and provides for high reliability in ink jet printing devices. This is a major advantage.

(2) The urethane resins and mixed urethane/urea resins of this invention may be specifically tailored to give certain physical properties that optimize the performance of the inks of this invention in ink jet printing devices and on the output substrate. These desirable ink properties include melting point, viscosity, transparency and the dynamic mechanical properties referenced in the aforementioned U.S. Pat. No. 5,389,958.

(3) The urethane resins and mixed urethane/urea resins of this invention are used in combination with the mono-amide wax and polyethylene wax to give ink compositions that display an improved yield stress versus temperature curve over prior art ink compositions. This enables ink droplets to be spread and fused at elevated temperatures during the fusing and transfer steps in an indirect printing process, but at a lower pressure than was possible with prior art inks.

(4) The ink formulations with the added polyethylene wax disclosed herein exhibit better surface finishes in the final poured, molded and hardened ink sticks when compared to equivalent ink sticks formulated without the polyethylene wax, as well as exhibiting better release characteristics from their plastic molds. The waste ink resulting from ink sticks of the present invention also releases more easily from the waste ink trays in the printers for which they are intended for use. Finally, output prints made from inks with the polyethylene wax additive also exhibit better blocking resistance at elevated temperatures.

Many other patents describe other materials for use in phase change ink jet inks. Some representative examples include U.S. Pat. Nos. 3,653,932; 4,390,369; 4,484,948; 4,684,956; 4,851,045; 5,006,170; 5,151,120; EP Application Nos. 0187352 and 0206286; and PCT Patent Application WO 94/04619. These other materials can include paraffins, microcrystalline waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the phase change carrier composition of this invention could optionally contain any of the optional other materials.

The aforementioned U.S. Pat. No. 5,496,879 and German patent publications DE 4205636AL and DE 4205713AL, assigned to Siegwerk Farbenfabrik Keller, Dr. Rung and Co., describe materials used for phase change or hot melt gravure printing. It will be obvious to those skilled in the art that the isocyanate-derived materials of this current invention would be compatible with those materials and could also be used in that application or other similar printing methods that employ hot melt ink technology.

It also will be obvious to those skilled in the art that other ink colors besides the subtractive primary colors are desirable for applications, such as postal marking or industrial marking and labeling using phase change printing, and that this invention is applicable to these needs. Infrared (IR) or ultraviolet (UV) absorbing dyes can also be incorporated into the inks of this invention for use in applications such as "invisible" coding or marking of products.

The inks of the present invention can be equally well employed in apparatus for direct or indirect (offset) printing applications. When employed in direct printing applications a suitable method of printing or producing a layer of a phase change colored ink directly on the surface of a substrate can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or print head;

(3) raising the operating temperature of the application means or print head to a level whereby a liquid phase, phase change colored ink composition is formed;

(4) providing a substrate in proximity to the application means;

(5) applying a predetermined pattern of the liquid phase, phase change colored ink composition to at least one surface of the substrate; and (6) lowering the temperature of the applied ink composition to form a solid phase, phase change ink pattern on the substrate.

An appropriate direct printing process is described in greater detail in U.S. Pat. No. 5,195,430.

When employed in indirect or offset printing applications a suitable method of printing or producing a layer of a phase change colored ink indirectly on the surface of a substrate by transferring from an intermediate transfer surface can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or a print head;

(3) raising the operating temperature of the application means or print head to a level whereby a liquid phase, phase change colored ink composition is formed;

(4) providing an intermediate transfer surface in proximity to the application means;

(5) applying a predetermined pattern of the liquid phase, phase change colored ink composition to the intermediate transfer surface;

(6) lowering the temperature of the applied ink composition to form a solid phase, phase change ink pattern on the intermediate transfer surface at a second, intermediate temperature;

(7) transferring said phase change ink composition from the intermediate transfer surface to a final substrate; and (8) fixing the phase change ink composition to the substrate to form a printed substrate, the phase change ink composition having (a) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (b) a ductility on the substrate after fixing.

An appropriate offset or indirect printing process is described in greater detail in U.S. Pat. No. 5,389,958.

The polyethylene wax of this invention can also be employed as an overcoat layer on a printed substrate. In this application, a substrate, preferably paper, is printed with any ink, preferably with a phase change ink, more preferably with a phase change ink composition of the present invention. The printed substrate is then coated with the polyethylene wax described above. Preferably, this overcoat only coats a minority portion of the surface area of the printed substrate, more preferably a regularly spaced dot matrix covering from about 1% to about 25% of the surface area of the printed substrate.

In one example of using an overcoat, printed pages of paper are made on a Tektronix Phaser® 340 ink jet ink printer by conventional means. The thus-produced printed paper then has a matrix of polyethylene wax dots (with about a 1% to about 5% fill) printed over the image. This wax dot matrix can be printed with another or the same ink jet printer. Preferably, the substrate after this overcoat operation is passed through a set of pressure rollers in the same ink jet printer to embed the polyethylene wax into the surface of the printed substrate. This treatment gives enhanced antiblocking properties to the prints (less transfer of ink from page to paper lying on top of output page when weighted and left standing) and also enables the prints to be fed through a copier automatic document feed (ADF) because of the decreased stickiness of the ink. Alternatively, the polyethylene wax could be applied to finished prints by other means such as an anilox roller, or could be jetted onto the transfix drum in an appropriate dot or other matrix before the rest of the image is applied to that drum, thus leaving the dot matrix of wax on top of the image after the transfix process.

The present invention is further described in detail by means of the following Examples and Comparisons. All parts and percentages are by weight and all temperatures are degrees Celsius unless explicitly stated otherwise. It is to be noted that while the following examples may recite only one colorant, it is to be understood that each individual example is only illustrative and any of the primary colorants (cyan, yellow, magenta and black) used in subtractive color printing could be employed in each instance.

EXAMPLE 1

The Reaction Product of Octylphenol Ethoxylate, Isophorone Diisocyanate and Yellow Reactive Colorant About 525.0 grams (4.73 equiv.) of isophorone diisocyanate[1] and 1.5 grams of dibutyltindilaurate[2] catalyst, followed by 986 grams (3.88 equiv.) of octylphenol ethoxylate[3], were added to a 3000 ml three-neck resin kettle equipped with a Trubore stirrer, $N_2$ atmosphere inlet, and a thermocouple-temperature controller. The reaction mixture was heated to about 135° C., about 346.1 grams (0.497 equiv.) of a yellow polymeric colorant corresponding to Colorant A from Table I of U.S. Pat. No. 5,231,135 were added and the reaction mixture was heated for approximately 2 hours. An additional about 110.0 grams (0.433 equiv.) of octylphenol ethoxylate[3] were added and the reaction mixture was heated at about 150° C. for approximately 2 hours. An FT-IR of the product was obtained to insure all of the isocyanate (NCO) functionality was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The diurethane reaction product was poured into aluminum molds and allowed to cool and harden. This final colored resin product was characterized by the following physical properties: viscosity of about 121 cPs as measured by a Ferranti-Shirley cone-plate viscometer at about 140° C., a melting point of about 38° C. to about 115° C. as measured by electrothermal capillary melting point apparatus, a $T_g$ of about 12.4° C. as measured by differential scanning calorimetry using a DuPont 2100 calorimeter at a scan rate of 20° C./minute, and a spectral strength of about 5634 milliliters Absorbance Units per gram at λmax as measured by dilution in n-butanol using a Perkin Elmer Lambda 2S UV/VIS spectrophotometer.

[1] Desmodur I—Isophorone diisocyanate available from Bayer Corp. of Pittsburg, Pa.

[2] Dibutyltindilaurate available from Aldrich Chemicals of Milwaukee, Wis.
[3] IGEPAL CA-210 octylphenol ethoxylate is available from Rhone-Poulenc Co., Cranbury, N.J.

EXAMPLE 2

The Reaction Product of 1.5 Parts Hydroabietyl Alcohol, 0.5 Parts Octadecyl Amine, and Isophorone Diisocyanate

About 240.2 grams (0.676 moles) of hydroabietyl alcohol[4] was added to a 1000 ml four-neck resin kettle equipped with a Trubore stirrer, an $N_2$ atmosphere inlet, 200 ml addition funnel, and a thermocouple temperature controller. About 100.0 grams (0.45 moles) of isophorone diisocyanate[5] was added to the addition funnel. Agitation of the hydroabietyl alcohol first was begun and then all of the isophorone diisocyanate was added over approximately 5 minutes. About 0.22 grams of dibutyltindilaurate[6] catalyst was added and the reaction mixture heated to about 125° C. under an $N_2$ atmosphere. After 4 hours at 125° C., about 59.95 grams (0.225 moles) of octadecyl amine[7] was added and the temperature raised to about 150° C. and held for approximately 2 hours. An FT-IR of the reaction product was run to insure all of the NCO functionality was consumed. The absence (disappearance) of a peak at about 2285 $cm^{-1}$ (NCO) and the appearance (or increase in magnitude) of peaks at about 1705–1635 $cm^{-1}$ and about 1515–1555 $cm^{-1}$ corresponding to urea frequencies and about 1740–1680 $cm^{-1}$ and about 1540–1530 $cm^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 314.8 cPs as measured by a Ferranti-Shirley cone-plate viscometer at about 140° C., a melting point of from about 67.9° C. to about 87.0° C. as measured by an electrothermal capillary melting point apparatus, and a $T_g$ of about 23° C. as measured by differential scanning calorimetry using a DuPont 2100 calorimeter at a scan rate of 20° C./minute.

[4] Arbitol E—Hydroabietyl alcohol available from Hercules Inc. of Wilmington, Del.
[5] Desmodur I—Isophorone diisocyanate available from Bayer Corp. of Pittsburgh, Pa.
[6] Dibutyltindilaurate available from Aldrich Chemicals of Milwaukee, Wis.
[7] Octadecyl amine (technical grade) available from ACROS Organics of New Jersey.

EXAMPLE 3

The Reaction Product of Octyphenol Ethoxylate, Isophorone Diisocyanate and Cyan Reactive Colorant

About 525.0 grams (4.73 equiv.) of isophorone diisocyanate[8], about 1.5 grams of dibutyltindilaurate[9] catalyst, and about 992.0 grams (3.91 equiv.) of octylphenol ethoxylate[10] were added to a 3000 ml three-neck resin kettle equipped with a Trubore stirrer, a $N_2$ atmosphere inlet, and a thermocouple-temperature controller. The reaction mixture was heated to about 135° C. and held for approximately 3.5 hours with stirring under nitrogen. About 240.6 grams (0.473 equiv.) of a cyan polymeric colorant[11] were then added and the mixture was heated at about 150° C. for approximately 2 hours. An FT-IR of the product was obtained to insure all of the isocyanate (NCO) functionality was consumed. The absence (disappearance) of a peak at about 2285 $cm^{-1}$ (NCO) and the appearance (or increase in magnitude) of peaks at about 1740–1680 $cm^{-1}$ and about 1515–1555 $cm^{-1}$ corresponding to urethane frequencies were used to confirm this. The diurethane reaction product was poured into aluminum molds and allowed to cool and harden. This final colored resin product was characterized by the following physical properties: viscosity of about 181.8 cPs as measured by a Ferranti-Shirley cone-plate viscometer at about 140° C., a melting point of about 59.9–70.2° C. as measured by electrothermal capillary melting point apparatus, and a $T_g$ of about 23.1° C. as measured by differential scanning calorimetry using a DuPont 2100 calorimeter at a scan rate of 20° C./minute, and a spectral strength of about 5588 milliliters Absorbance Units per gram at λmax as measured by dilution in n-butanol using a Perking Elmer Lambda 2S UV/VIS spectrophotometer.

[8] Desmodur I—Isophorone diisocyanate available from Bayer Corp. of Pittsburgh, Pa.
[9] Dibutyltindilaurate available from Aldrich Chemicals of Milwaukee, Wis.
[10] IGEPAL CA-210 octylphenol ethoxylate is available from Rhone-Poulenc Co., Cranbury, N.J.
[11] Experimental Blue III 9495-28 available from Milliken and Company of Spartanburg, S.C.

EXAMPLE 4

The Reaction Product of Octylphenol Ethoxylate, Isophorone Diisocyanate and Blended Black Reactive Colorants

About 150.0 grams (0.295 equiv.) of a cyan polymeric reactive colorant[12], about 225.0 grams (0.147 equiv.) of a violet polymeric colorant corresponding to Colorant U from Table I of U.S. Pat. No. 5,231,135; about 345.0 (0.552 equiv.) of an orange polymeric reactive colorant corresponding to Colorant B from Table I of U.S. Pat. No. 5,231,135; about 450.0 grams (4.054 equiv.) of isophorone diisocyanate[13] and about 0.18 grams of dibutyltindilaurate catalyst[14] were added to a 3000 ml three-neck resin kettle equipped with a Trubore stirrer, a $N_2$ atmosphere inlet, and a thermocouple-temperature controller. The reaction mixture was heated to about 90° C. with stirring under nitrogen. After 3.5 hours at about 90° C., about 1.0 grams of additional dibutyltindilaurate catalyst[14] and about 805.0 grams (3.012 equiv.) of octylphenol ethoxylate[15] were added and the temperature was raised to about 130° C. and held for approximately 3.5 hours. An FT-IR of the product was obtained to insure that all of the isocyanate (NCO) functionality was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The diurethane reaction product was poured into aluminum molds and allowed to cool and harden. This final colored resin product was characterized by the following physical properties: viscosity of about 163.0 cPs as measured by a Ferranti-Shirley cone-plate viscometer at about 140° C., a melting point of below ambient temperature and not measurable by electrothermal melting pint apparatus, a $T_g$ of about 3.8° C. as measured by differential scanning calorimetry using a DuPont 2100 calorimeter at a scan rate of 20° C./minute, and a spectral strength of about 4667 milliliters Absorbance Units per gram at λmax as measured by dilution in n-butanol using a Perkin Elmer Lambda 2S UV/VIS spectrophotometer.

[12] Experimental Blue III 9495-28 available from Milliken and Company of Spartanburg, S.C.
[13] Desmodur I—Isophorone diisocyanate available from Bayer Corp. of Pittsburgh, Pa.
[14] Dibutyltindilaurate available from Aldrich Chemicals of Milwaukee, Wis.
[15] IGEPAL CA-210 octylphenol ethoxylate is available from Rhone-Poulenc Co., Cranbury, N.J.

EXAMPLE 5

Cyan Ink Made From Amide Wax, Polyethylene Wax, Mixed Urethane/Urea Resin and Cyan Colored Urethane Resin

In a stainless steel beaker were combined about 237.5 grams of the cyan colored resin from Example 3, about 237.5 grams of the reaction product urethane/urea mixture material from Example 2 above, about 473 grams of Witco S-180 stearyl stearamide[16], about 50 grams of polyethylene wax[17] and about 2 grams of Uniroyal Naugard 445 antioxidant[18]. The materials were melted together at a temperature of about 125° C. in an oven, then blended by stirring in a temperature controlled mantle at about 125° C. for about one hour. After stirring for about one hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.7 cPs as measured by a Ferranti-Shirley cone-plate viscometer at about 140° C., a melting point of about 89° C. as measured by differential scanning calorimetry using a DuPont 2100 calorimeter, and a $T_g$ of about 21.9° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1469 milliliters Absorbance Units per gram at $\lambda$max.

[16] Kemamide S-180—Stearyl stearamide available from Witco Chemical Company of Memphis, Tenn.
[17] Polywax 850—Polyethylene wax available from Petrolite Chemical of Tulsa, Okla.
[18] Naugard 445—antioxidant available from Uniroyal Chemical Company of Oxford, Conn.

EXAMPLE 6

Yellow Ink Made From Amide Wax, Polyethylene Wax, Mixed Urethane/Urea Resin and Yellow Colored Urethane Resin In a stainless steel beaker were combined about 264 grams of the colored resin from Example 1 above, about 225.7 grams of the material from Example 2 above, about 458 grams of Witco S-180 stearyl stearamide[19], about 50 grams of polyethylene wax[20] and about 2.0 grams of Uniroyal Naugard 445 antioxidant[21]. The materials were melted together at a temperature of about 125° C. in an oven, then blended by stirring in a temperature controlled mantle at about 125° C. for about one hour. The yellow ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.7 cPs as measured by a Ferranti-Shirley cone-plate viscometer at about 140° C., a melting point of about 90° C. as measured by differential scanning calorimetry using a DuPont 2100 calorimeter, and a $T_g$ of about 20° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1529 milliliters Absorbance Units per gram at $\lambda$max.

[19] Kemamide S-180—Stearyl stearamide available from Witco Chemical Company of Memphis, Tenn.
[20] Polywax 850—Polyethylene wax available from Petrolite Chemical of Tulsa, Okla.
[21] Naugard 445—antioxidant available from Uniroyal Chemical Company of Oxford, Conn.

EXAMPLE 7

Black Ink Made from Amide Wax, Polyethylene Wax Mixed Urethane/Urea Resin and Black Colored Urethane Resin In a stainless steel beaker were combined about 220 grams of the colored urethane resin from Example 4 above, about 220 grams of the reaction product urethane/urea mixture material from Example 2 above, about 508 grams of Witco S-180 stearyl stearamide[22], about 50 grams of polyethylene wax[23] and about 2.0 grams of Uniroyal Naugard 445 antioxidant[24]. The materials were melted together at a temperature of about 125° C. in an oven, then blended by stirring in a temperature controlled mantle at about 125° C. for about one hour. The black ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.9 cPs as measured by a Ferranti-Shirley cone-plate viscometer at about 140° C., a melting point of about 89° C. as measured by differential scanning calorimetry using a DuPont 2100 calorimeter, and a $T_g$ of about 16° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1434 milliliters Absorbance Units per gram at $\lambda$max.

[22] Kemamide S-180—Stearyl stearamide available from Witco Chemical Company of Memphis, Tenn.
[23] Polywax 850—Polyethylene wax available from Petrolite Chemical of Tulsa, Okla.
[24] Naugard 445—antioxidant available from Uniroyal Chemical Company of Oxford, Conn.

PRINT AND PERFORMANCE TESTING

The inks in Examples 5, 6, and 7 were tested in a Tektronix Phaser® 340 printer, which uses an offset transfer printing system. All of the above inks were found to completely transfer and to give images of good color, print quality and durability either as primary colors or when used in combination with each other or the commercially available Phaser® 340 printer inks.

The inks of Examples 5, 6 and 7 were poured into molded HIPSMA (High Impact Polystyrene/Maleic Anhydride) plastic cups or tubs and allowed to cool and solidify. The finished solid ink sticks from these examples had markedly better surface finishes and better release properties from the plastic cups when compared to comparable formulations without the polyethylene wax additive.

Prints made from these examples showed better blocking resistance at high temperatures when compared to comparable formulations without the polyethylene wax additives. The blocking test used is described on page 56 of the Proceedings of NIP12: The Twelfth International Congress on Digital Printing Technologies, published in 1996 by the Society for Imaging Science and Technology.

EXAMPLE 8

About 500 grams of Petrolite PE850 wax was filtered in a Mott apparatus using Whatman #3 paper. The filtration was done at about 125° C. and 15 psi. The filtered polyethylene wax was poured into aluminum ink molds and allowed to harden in the shape of Phaser® 300 ink sticks. The wax sticks were placed in the ink reservoir of a Tektronix Phaser® 300 printer. This printer was used to print a matrix of PE wax dots over the top of images previously made using a Phaser® 340 printer. The matrix varied from about 1% area coverage to about 20% area coverage. It was found that a matrix of about 5% coverage of wax dots was a good compromise between placing a minimum amount of wax over the image and obtaining good document feeding performance in a photocopier. This overprinting method was effective to enhance the document-feeding performance of prints made with commercial Phaser® 340 inks, as well as the inks from the aforementioned U.S. Pat. No. 5,830,942, when the output sheets were fed through the automatic document feeder of a number of different model photocopiers, including models made by Xerox, Canon and Minolta.

While the invention has been described above with reference to specific embodiments thereof, it is apparent that many changes, modifications and variations can be made without departing from the inventive concept disclosed herein. For example, it should be noted where a urethane reaction product is obtained, a single alcohol precursor or multiple alcohol precursors may be used with an appropriate isocyanate as long as the required stoichiometric ratio is maintained. Similarly, where a urea is the reaction product, a single amine precursor or multiple amine precursors may employed as long as the required stoichiometric ratio is maintained. Where a urethane/urea reaction product is obtained, single or multiple alcohol and amine precursors may be employed within the appropriate stoichiometric ratios. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink carrier composition comprising in combination:
   (a) a urethane resin that is the reaction product of the reaction of at least one alcohol and an isocyanate, wherein the alcohol is selected from the group consisting of a monohydric aliphatic alcohol, a monohydric aromatic alcohol, a monohydric aliphatic/aromatic alcohol, a monohydric fused ring alcohol, a polyol and mixtures thereof: and/or;
   (b) a mixed urethane/urea resin that is the reaction product of at least one alcohol, an isocyanate, and at least one amine; and
   (c) at least one mono-amide; and
   (d) at least one polyethylene wax.

2. The phase change ink carrier composition of claim 1 wherein the isocyanate in the urethane resin is selected from the group consisting of a monoisocyanate, a diisocyanate, a triisocyanate, a copolymer of a diisocyanate, and a copolymer of a triisocyanate.

3. The phase change ink carrier composition of claim 2 wherein the isocyanate in the urethane resin is an isophorone diisocyanate.

4. The phase change ink carrier composition of claim 1 wherein the alcohol in the urethane resin is selected from the group consisting of hydroabietyl alcohol, octylphenol ethoxylate and octadecyl alcohol.

5. The phase change ink carrier composition of claim 4 wherein the alcohol in the urethane resin is octylphenol ethoxylate.

6. The phase change in carrier composition of claim 1 wherein the alcohol in the mixed urethane/urea resin is selected from the group consisting of a monohydric aliphatic alcohol, a monohydric aromatic alcohol, a monohydric aliphatic/aromatic alcohol, a monohydric fused ring alcohol, a polyol and mixtures thereof.

7. The phase change ink carrier composition of claim 6 wherein the alcohol in the mixed urethane/urea resin is selected from the group consisting of hydroabietyl alcohol, octylphenol ethoxylate and octadecyl alcohol.

8. The phase change ink carrier composition of claim 1 wherein the isocyanate employed in making the mixed urethane/urea resin is selected from the group consisting of a monoisocyanate, a diisocyanate, a triisocyanate, a copolymer of a diisocyanate, and a copolymer of a triisocyanate.

9. The phase change ink carrier composition of claim 1 wherein the amine in the mixed urethane/urea resin is selected from the group consisting of an aliphatic monoamine, an aromatic monoamine, an aliphatic/aromatic monoamine, a fused right system monoamine, a multifunctional monoamine, and a hydroxyl/amino containing compound.

10. The phase change ink carrier composition of claim 9 wherein the amine in the mixed urethane/urea resin is octadecyl amine.

11. The phase change ink carrier composition of claim 1 wherein said mono-amide is stearyl stearamide.

12. The phase change ink carrier composition of claim 1 wherein the polyethylene wax has a molecular weight of about 500 to about 5,000.

13. The phase change ink carrier composition of claim 12 wherein the polyethylene wax has a molecular weight of about 700 to about 2,000.

14. The phase change ink carrier composition of claim 1 further comprising at least one anti-oxidant.

15. The phase change ink carrier composition of claim 1 further comprising at least one phase change compatible colorant; thereby forming a phase change ink composition.

16. The phase change ink composition of claim 15 wherein the phase change compatible colorant is a dye, a colored resin or a pigment.

17. A phase change ink carrier composition comprising in combination:
   (a) a urethane resin that is the reaction product of the reaction of at least one alcohol and an isocyanate, wherein the alcohol is selected from the group consisting of a monohydric aliphatic alcohol, a monohydric aromatic alcohol, a monohydric aliphatic/aromatic alcohol, a monohydric fused ring alcohol, a polyol and mixtures thereof; and/or
   (b) a mixed urethane/urea resin, the mixed urethane/urea resin that is the reaction product of at least one alcohol, an isocyanate and at least one amine, the isocyanate being selected from the group consisting of a monoisocyanate, a diisocyanate, a triisocyanate, a copolymer of a diisocyanate, and a copolymer of a triisocyanate and the amine being selected from the group of amines consisting of an aliphatic monoamine, an aromatic monoamine, an aliphatic/aromatic monoamine, and a fused ring system monoamine, and a hydroxyl/amino containing compound; and
   (c) at least one mono-amide; and
   (d) at least one polyethylene wax.

18. The phase change ink carrier composition of claim 17 wherein the isocyanate is isophorone diisocyanate.

19. The phase change ink carrier composition of claim 17 wherein the amine employed in making the urethane urea resin is octadecyl amine.

20. The phase change ink carrier composition of claim 17 wherein said mono-amide is stearyl stearamide.

21. The phase change ink carrier composition of claim 17 wherein the polyethylene wax has a molecular weight of about 500 to about 5,000.

22. The phase change ink carrier composition of claim 21 wherein the polyethylene wax has a molecular weight of about 700 to about 2,000.

23. The phase change ink composition of claim 17 further including an anti-oxidant.

24. The phase change ink composition of claim 17 where the alcohol in the mixed urethane/urea resin is selected from the group consisting of a monohydric aliphatic alcohol, a monohydric aliphatic/aromatic alcohol, a monohydric fused ring alcohol, a polyol and mixtures thereof.

25. The phase change ink composition of claim 24 wherein the alcohol in the mixed urethane/urea resin is selected from the group consisting of hydroabietyl alcohol, octylphenol ethoxylate and octadecyl alcohol.

26. The phase change ink carrier composition of claim 17 further including a phase change compatible colorant, thereby forming a phase change ink composition.

27. The phase change ink composition of claim 26 wherein the phase change compatible colorant is a dye, a colored resin or a pigment.

28. A phase change ink carrier composition comprising in combination:
(a) a urethane resin that is the reaction product of the reaction of at least one alcohol and an isocyanate, the alcohol further being selected from the group consisting of hydroabietyl alcohol, octyphenol ethoxylate, and octadecyl alcohol; and/or
(b) a mixed urethane/urea resin that is the reaction product of at least one alcohol, an isocyanate, and at least one monoamine; and
(c) at least one mono-amide; and
(d) at least one polyethylene wax.

29. The phase change ink carrier composition of claim 28 wherein the alcohol in the urethane resin is octylphenol ethoxylate.

30. The phase change ink carrier composition of claim 28 wherein the alcohol in the mixed urethane/urea resin is selected from the group consisting of a monohydric aliphatic alcohol, an monohydric aromatic alcohol, a monohydric aliphatic/aromatic alcohol, a monohydric fused ring alcohol, a polyol and mixtures thereof.

31. The phase change ink carrier composition of claim 30 wherein the alcohol in the mixed urethane/urea resin is selected from the group consisting of hydroabietyl alcohol, octylphenol ethoxylate and octadecyl alcohol.

32. The phase change ink carrier composition of claim 31 wherein the isocyanate employed in making the mixed urethane/urea resin reaction product is selected from the group consisting of a monoisocyanate, a diisocyanate, a triisocyanate, a copolymer of a diisocyanate, and a copolymer of a triisocyanate.

33. The phase change ink carrier composition of claim 32 wherein the isocyanate employed in making the mixed urethane/urea resin reaction product is isophorone diisocyanate.

34. The phase change ink carrier composition of claim 33 wherein the amine in the mixed urethane/urea resin is selected from the group of amines consisting of an aliphatic monoamine, an aromatic monoamine, an aliphatic/aromatic monoamine, a fused ring system monoamine, and a hydroxyl/amino containing compound.

35. The phase change ink carrier composition of claim 34 wherein the amine in the mixed urethane/urea resin is octadecyl amine.

36. The phase change ink carrier composition of claim 28 wherein said mono-amide is stearyl stearamide.

37. The phase change ink carrier composition of claim 36 wherein the polyethylene wax has a molecular weight of about 500 to about 5,000.

38. The phase change ink carrier composition of claim 37 wherein the polyethylene wax has a molecular weight of about 700 to about 2,000.

39. The phase change ink carrier composition of claim 38 further comprising at least one phase change compatible colorant, thereby forming a phase change ink composition.

40. A phase change ink carrier composition comprising in combination:
(a) a urethane resin that is the reaction product of the reaction of at least one alcohol and an isocyanate, wherein the alcohol is selected from the group consisting of a monohydric aliphatic alcohol, a monohydric aromatic alcohol, a monohydric aliphatic/aromatic alcohol, a monohydric fused ring alcohol, a polyol and mixtures thereof; and/or
(b) a mixed urethane/urea resin, the mixed urethane/urea resin and being the reaction product of at least one alcohol, an isocyanate and octadecyl amine, the isocyanate being selected from the group consisting of a monoisocyanate, a diisocyanate, a triisocyanate, a copolymer of a diisocyanate, and a copolymer of a trsocyanate; and at least one amine; and
(c) at least one mono-amide; and
(d) at least one polyethylene wax.

41. The phase change ink carrier composition of claim 40 wherein the isocyanate in the mixed urethane/urea resin is isophorone diisocyanate.

42. The phase change ink carrier of claim 40 wherein said mono-amide is stearyl stearamide.

43. The phase change ink carrier composition of claim 40 wherein the polyethylene wax has a molecular weight of about 500 to about 5,000.

44. The phase change ink carrier composition of claim 43 wherein the polyethylene wax has a molecular weight of about 700 to about 2,000.

45. The phase change ink carrier composition of claim 40 further comprises a phase change compatible colorant, thereby forming a phase change ink composition.

46. The phase change ink composition of claim 45 wherein the phase change compatible colorant is a dye, a colored resin or a pigment.

47. The phase change ink composition of claim 46 further including an anti-oxidant.

48. A phase change ink composition comprising in combination:
(a) a urethane resin that is the product of the reaction of at least one alcohol and an isocyanate, the alcohol further being selected from the group of alcohols consisting of a monohydric aliphatic alcohol, a monohydric aromatic alcohol, a monohydric aliphatic/aromatic alcohol, a monohydric fused ring alcohol, a polyol and mixtures thereof; and/or
(b) a mixed urethane/urea resin that is the reaction product of an isocyanate, at least one alcohol and octadecyl amine; and
(c) at least one mono-amide; and
(d) at least one polyethylene wax; and
(e) at least one colorant.

49. The phase change ink composition of claim 48 wherein the at least one alcohol in the urethane resin is selected from the group consisting of hydroabietyl alcohol, octylphenol ethoxylate and octadecyl alcohol.

50. The phase change ink composition of claim 48 wherein the alcohol in the mixed urethane/urea resin is selected from the group of alcohols consisting of a monohydric aliphatic alcohol, a monohydric aromatic alcohol, a monohydric aliphatic/aromatic alcohol, a monohydric fused ring alcohol, a polyol and mixtures thereof.

51. The phase change ink composition of claim 50 wherein the alcohol in the mixed urethane/urea resin is selected from the group consisting of hydroabietyl alcohol, octylphenol ethoxylate and octadecyl alcohol.

52. The phase change ink composition of claim 48 wherein the isocyanate employed in making the mixed urethane/urea resin reaction product is selected from the group consisting of a monoisocyanate, a diisocyanate, a triisocyanate, a copolymer of a diisocyanate, and a copolymer of a triisocyanate.

53. The phase change ink composition of claim 52 wherein the isocyanate employed in making the mixed urethane/urea resin reaction product is isophorone diisocyanate.

54. The phase change ink composition of claim 48 wherein the amine in the mixed urethane/urea resin is selected from the group of amines consisting of an aliphatic monoamine, an aromatic monoamine, an aliphatic/aromatic monoamine, a fused ring system monoamine, a multifunctional monoamine, and a hydroxyl/amino containing compound.

55. The phase change ink composition of claim 48 wherein the colorant is a dye, a colored resin or a pigment.

56. The phase change ink composition of claim 48 wherein said mono-amide is stearyl stearamide.

57. The phase change ink carrier composition of claim 48 wherein the polyethylene wax has a molecular weight of about 500 to about 5,000.

58. The phase change ink carrier composition of claim 57 wherein the polyethylene wax has a molecular weight of about 700 to about 2,000.

59. A method for producing a layer of a phase change ink on a surface of a substrate, which comprises:

(1) forming a phase change ink composition in the solid phase, comprising an admixture of (a) a phase change carrier composition and (b) a compatible phase change colorant material; said phase change carrier composition comprising (i) a urethane resin that is the reaction product of at least one alcohol and an isocyanate; and/or (ii) a urethane/urea resin that is the reaction product of an isocyanate, at least one alcohol, and at least one monoamine; and (iii) at least one mono-amide; and (iv) at least one polyethylene wax;

(2) transferring said solid phase, phase change ink composition to a phase change ink application means;

(3) raising the operating temperature of said application means to a level whereby a liquid phase, phase change ink composition is formed;

(4) providing a substrate in proximity to said application means;

(5) applying a predetermined pattern of said liquid phase, phase change ink composition to at least one surface of said substrate; and (6) lowering the temperature of said applied ink composition to form a solid phase, phase change ink pattern on the substrate.

60. A method for producing a layer of a phase change ink on the surface of a substrate, which comprises:

(1) employing in a printing apparatus a phase change ink composition in the solid phase comprising an admixture of (a) a phase change carrier composition and (b) a compatible phase change colorant material; said phase change carrier composition comprising (i) a urethane resin that is the reaction product of at least one alcohol and an isocyanate; and/or (ii) a urethane/urea resin that is the reaction product of at least one alcohol, an isocyanate and at least one monoamine; and (iii) at least one mono-amide; and (iv) at least one polyethylene wax;

(2) applying the phase change ink composition in a desired pattern to an intermediate transfer surface;

(3) transferring the desired pattern of the phase change ink composition to the surface of the substrate.

* * * * *